(12) United States Patent
Reinert

(10) Patent No.: US 8,720,479 B2
(45) Date of Patent: May 13, 2014

(54) LOCKOUT DEVICE FOR MANUALLY OPERATED SELECTOR VALVE

(76) Inventor: Matthew Joseph Reinert, Burlington Flats, NY (US)

(*) Notice: Subject to any disclaimer, the term of this patent is extended or adjusted under 35 U.S.C. 154(b) by 75 days.

(21) Appl. No.: 13/419,413

(22) Filed: Mar. 13, 2012

(65) Prior Publication Data

US 2012/0234405 A1 Sep. 20, 2012

Related U.S. Application Data

(60) Provisional application No. 61/454,502, filed on Mar. 19, 2011.

(51) Int. Cl.
*F16K 35/00* (2006.01)
(52) U.S. Cl.
USPC ............................................ 137/385; 251/90
(58) Field of Classification Search
USPC ......... 137/385, 565.12, 272, 382; 251/90, 93, 251/89; 417/334–336; 70/175
See application file for complete search history.

(56) References Cited

U.S. PATENT DOCUMENTS 122,517 A * 1/1872 Edson ........................... 137/382
5,143,114 A * 9/1992 Daniels .......................... 137/385

FOREIGN PATENT DOCUMENTS

GB 2073371 A * 10/1981 ............ F16K 11/085

* cited by examiner

*Primary Examiner* — John K Fristoe, Jr.
*Assistant Examiner* — Kevin E Lynn

(57) ABSTRACT

A one piece valve lockout device for use with a quarter turn, rotary selector valve that is closed at the one-eighth turn position and is mounted on a common assembly with a manually operated pump. The device includes parallel ears configured in a U shape, used to secure the device to the pumping assembly. The ears are oriented 45 degrees from a locking arm. The locking arm has two parallel plates extending downward around a valve handle. The parallel plates have pairs of aligned holes in which a padlock can be inserted, preventing unauthorized removal of the device.

20 Claims, 7 Drawing Sheets

LOCKOUT DEVICE FOR MANUALLY OPERATED SELECTOR VALVE

This application claims priority on U.S. Provisional Application No. 61/454,502 filed Mar. 19, 2011 titled "Lockout Device for Manually Operated Selector Valve"

REFERENCES CITED

| | | |
|---|---|---|
| 5,003,797 | Wirth et al. | April 1991 |
| 6,718,804 | Graves et al. | April 2004 |
| 7,207,198 | Benda | April 2007 |
| 7,870,767 | Brojanac et al. | January 2011 |

FEDERALLY SPONSORED

N/A

SEQUENCE LISTING

N/A

FIELD OF THE INVENTION

The present invention relates to safety devices and more specifically to the prevention or unintentional operation of a manually operated quarter turn selector valve.

BACKGROUND

Fluid system maintenance has long required the locking out of valves to prevent the unintentional operation of components within the system to safely perform work on that system. Oftentimes lockout devices are not available for the various configurations of valves presently made. This invention is used in instances where presently available lockout devices are not practical, desirable, or effective against the unintentional operation of a valve.

Several of the lockout devices previously invented require the removal of the valve handle such as the device in U.S. Pat. No. 7,870,767. U.S. Pat. No. 7,207,198 can be effective against valve operation, but can be complicated and timely to install. Many other devices available only lock a valve in a 90 degree position such as U.S. Pat. Nos. 5,003,797 and 6,718,804 which cannot perform a satisfactory lockout of a quarter turn valve in the 45 degree position. These devices also typically rely on the valve piping to provide device anchorage.

In order to meet governmental regulations, such as those mandated by the Occupational Safety and Health Administration (OSHA) and to protect workers sufficiently from hazards posed by a poorly locked out valve, the present invention was created.

SUMMARY OF THE INVENTION

The present invention relates to a lockout device that prevents the unauthorized operation of a selector valve which controls the directional flow of fluid in a system. Specifically it relates to a manually operated pump and manually operated selector valve mounted on a common assembly. This type of system is typically used to operate a double acting hydraulic cylinder with only operator input and no need for other auxiliary systems or electricity.

The lockout device is used to lock the handle of the two-way, quarter turn valve in the 45 degree position and uses a portion of the pump for anchorage of the lockout device. For stated valve, the 45 degree position relates to the closed position of the valve. This lockout device was initially invented to be used during the maintenance and repairs of commercial wind turbines whereas most wind turbines are not designed or manufactured in the United States and oftentimes do not necessarily come equipped with machinery that can be locked out to meet government regulations such as those promulgated by the Occupational and Safety Hazards Administration (OSHA).

The invention is a one piece, lightweight unit with no moving parts specifically designed to be easily carried in the pocket of a worker to the job site. The lockout device could be used in many industries including factories and aboard various types of vessels. Primary considerations for the design of this lockout device invention and what sets it apart from many other such devices are ease of use, durability, low weight, speed of installation, simplicity, effectiveness, and low cost of manufacture.

DESCRIPTION OF THE DRAWINGS

Complete understanding of the invention will become apparent from the detailed description with reference to the accompanying drawings, in which reference numbers refer to associated parts and in which.

DETAILED DESCRIPTION OF THE INVENTION

Figure 1:
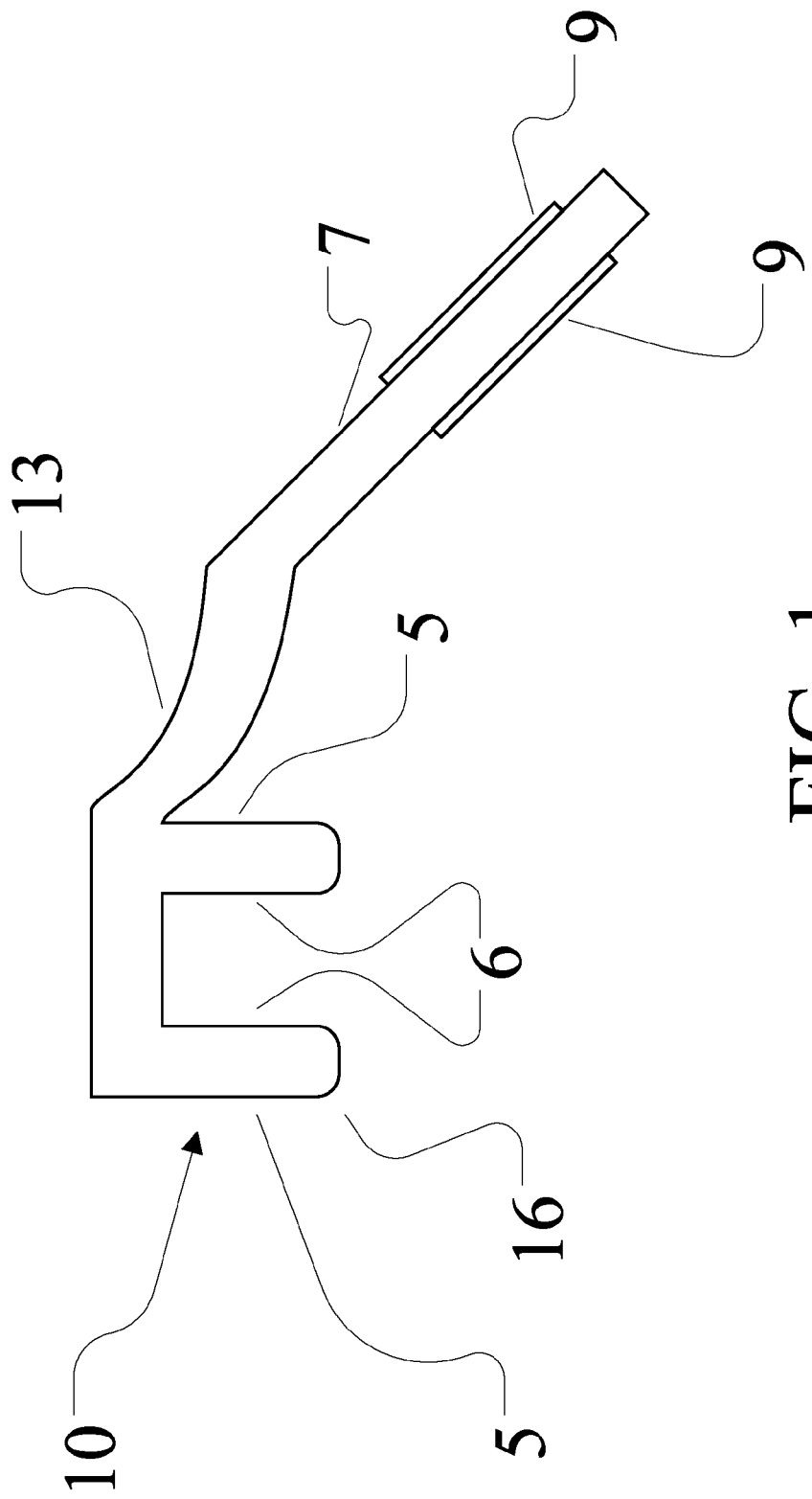
FIG. 1. Is an overhead view of the lockout device invention
Figure 2:
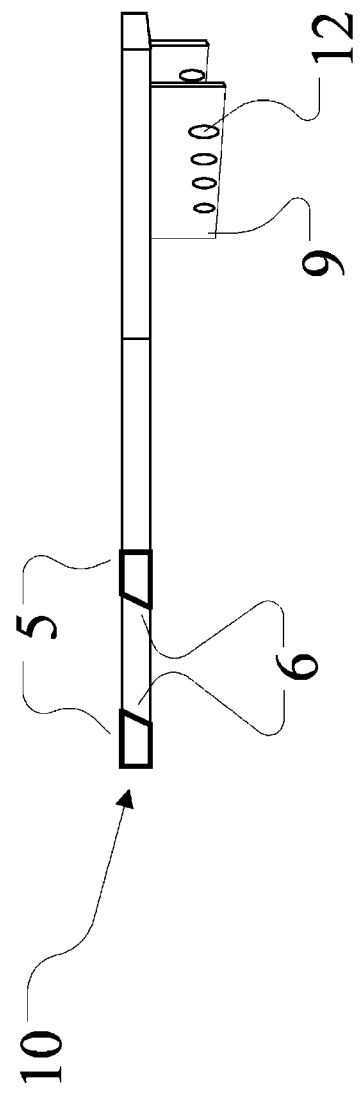
FIG. 2. Is a side view of the lockout device invention
Figure 3:
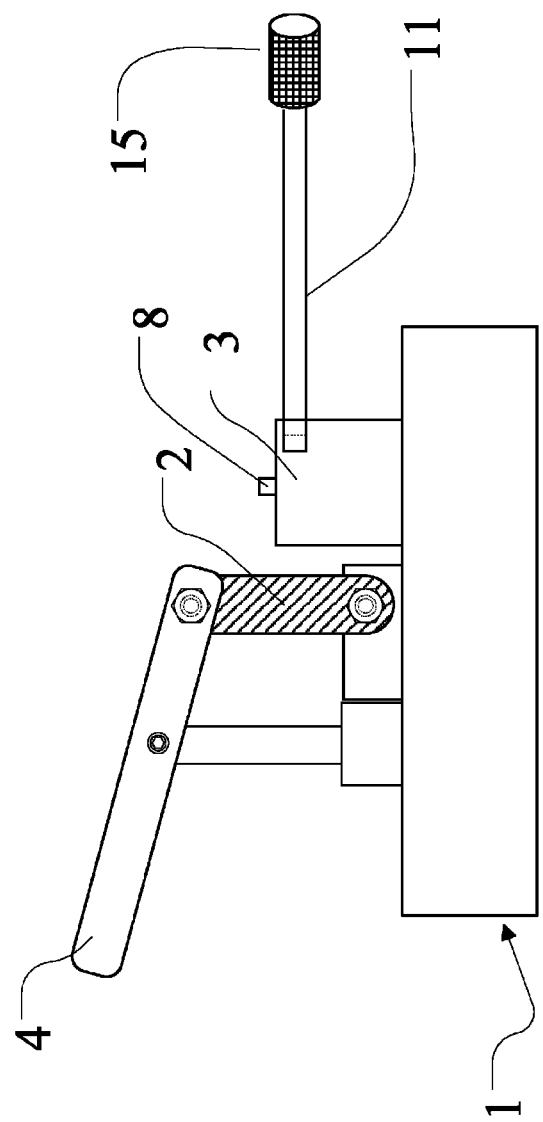
FIG. 3. Is a side view of a typical manually operated pump and manually operated selector valve assembly FIG. 4. Is an overhead view of a typical manually operated pump and manually operated selector valve assembly FIG. 5. Is an overhead view showing the lockout device invention installed on the pump and selector valve assembly FIG. 6. Is a side view showing the lockout device invention installed on the pump and selector valve assembly FIG. 7. Is an alternate design of the lockout device invention which incorporates a two piece construction
Figure 4:
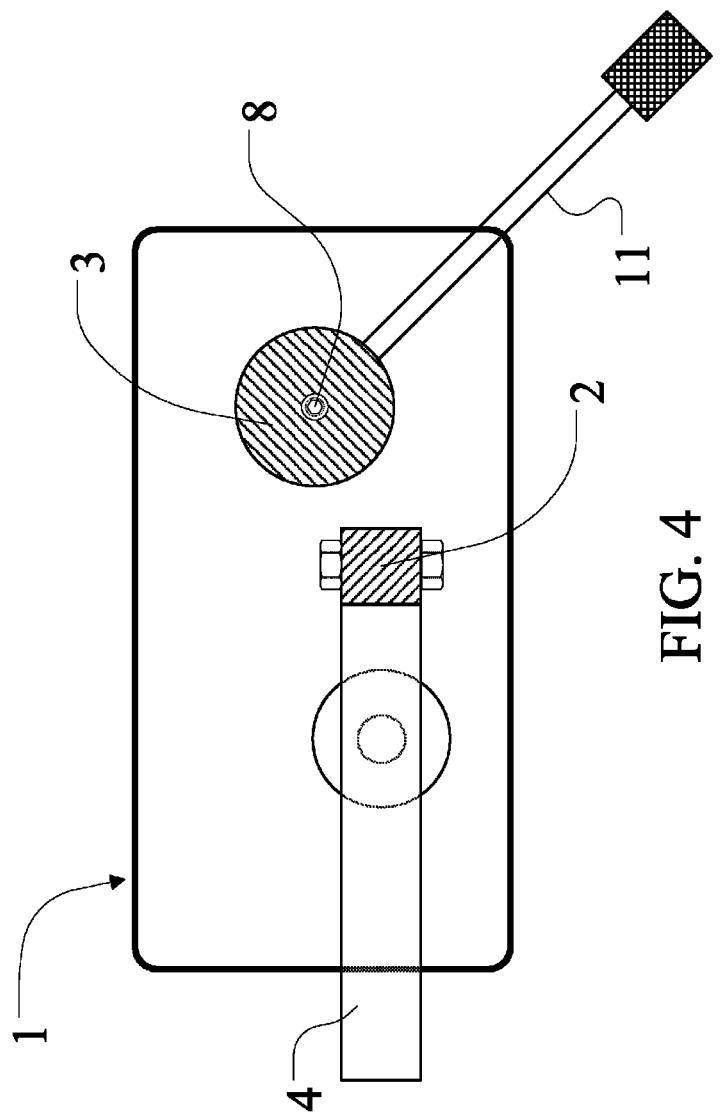
Figure 5:
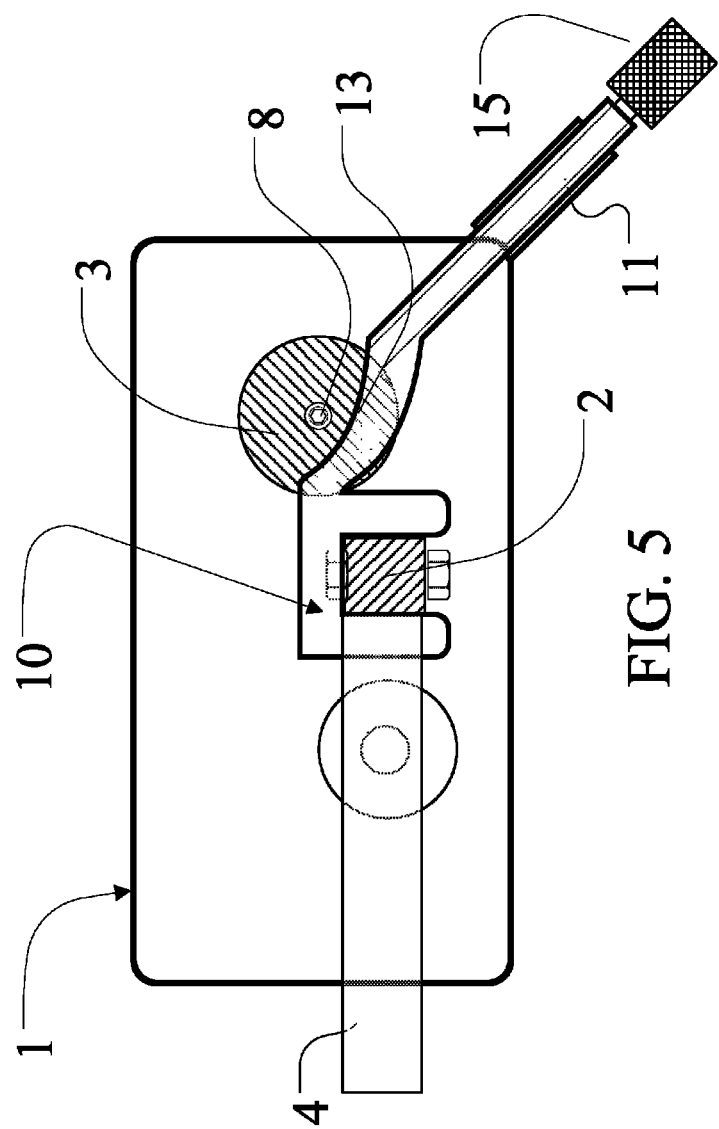
Figure 6:
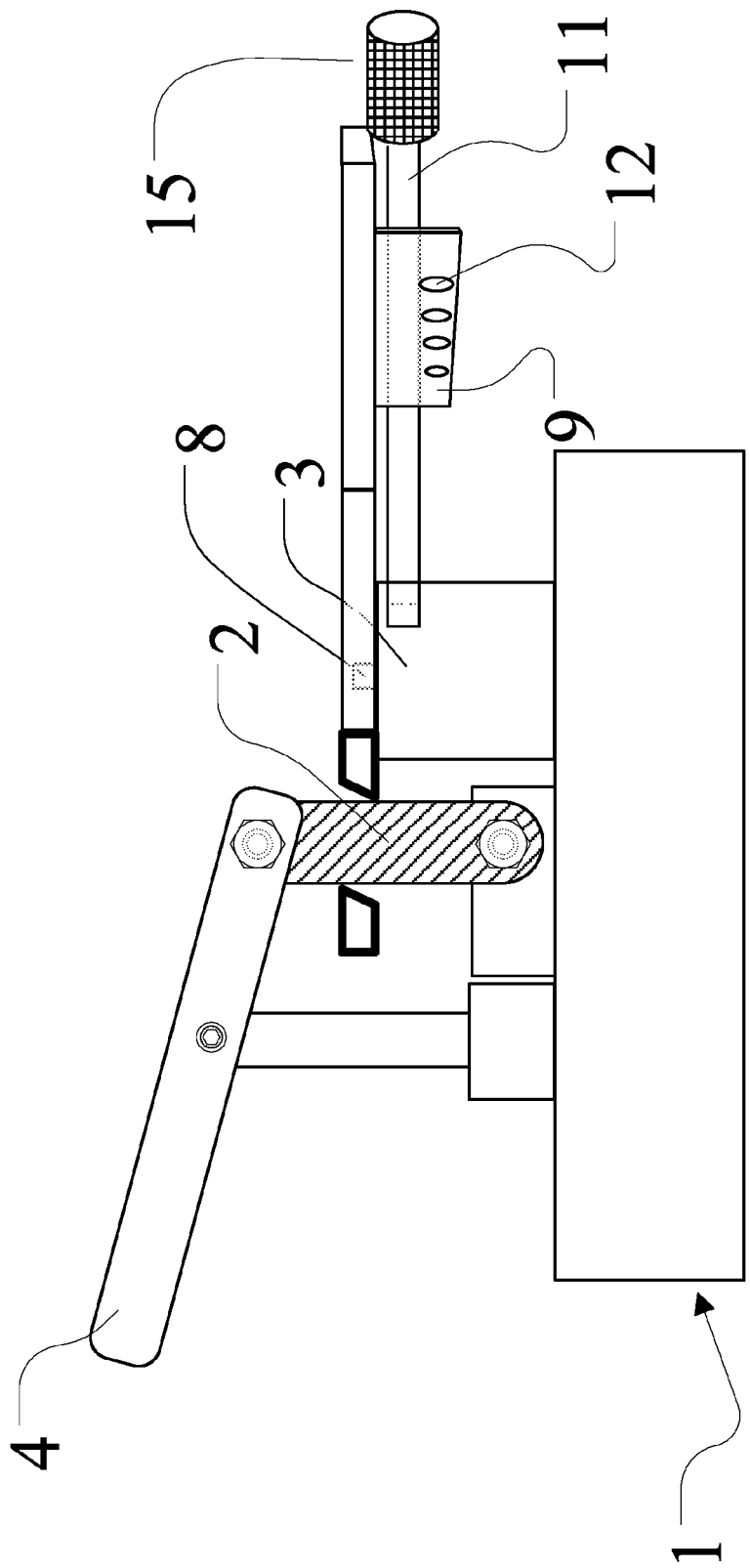

The lockout device 10 is designed to be used with a fluid system in which a manually operated pump 4 and associated selector valve 3 are mounted on the same assembly 1 which is typically mounted on top of the fluid reservoir for the system. The lockout device relies on the pump pivot linkage 2 for primary anchorage of the lockout device. The pump pivot linkage relation to the selector valve 3 determines the manufacturing dimensions for the lockout device.

The lockout device 10 would typically be made entirely of sheet steel, but could be manufactured out of nearly any durable and machinable material. In the embodiment shown in FIGS. 1-2 and 5-6, a single and continuous piece is used to form the majority of the device, with the possible exception of the locking plates 9. The device consists of two parallel ears 5 which are spaced so as to slide around the square or rectangular shaped manual hydraulic pump pivot point linkage 2, and define a pump engagement portion of the lockout device 10. The dimension between the ears 5 is the same as the dimension of the pump pivot point linkage 2. Both ears 5 have a radius formed at both the inside and outside ends 16 of the U shaped opening that is formed by the parallel ears 5. Both of the ears 5 are chamfered on the inner edge 6 to provide ease of installation whereas the lockout device 10 can be installed at an angle while sliding onto the pump pivot point linkage 2.

This angle prevents interference between the locking plates 9 and the valve handle 11 during installation.

Once in position, the lockout device 10 is laid flat allowing the locking plates 9 to straddle the valve handle 11. In the process of laying the lockout device flat, the dimensional clearance between ears 5 and pivot point linkage 2 is decreased due to the parallel chamfered edges 6 of the ears 5. This action thereby secures the lockout device to the pivot point linkage 2 which acts as the mechanism by which the lockout device 10 is stabilized and which rotation of the locking arm 7 is prevented.

The locking arm 7 is attached to a connector arm 13. The locking arm 7 is situated at a 45 degree angle in relation to the parallel ears 5. The connecting arm 13 is manufactured with a radius that prevents interference with the fastener 8 that secures that operating handle onto the selector valve 3. The length of the locking arm 7 is limited such that interference does not occur with the end of the valve handle 15.

Perpendicular to the locking arm 7 and extending down vertically are two parallel locking plates 9 situated on either side of the locking arm 7, which straddle the handle 11 of the selector valve 3 when lockout device 10 is installed and prevents movement of said handle 11. Within the parallel locking plates 9 are of sets of aligned holes 12 that are situated opposite each other and provide a means for padlock installation which prevents unauthorized removal of the lockout device. The number of hole pairs is dependent on the number of padlocks that are desired to be used.

The height of the locking plates 9 and more importantly the top of the holes 12 is such that installation of a padlock hasp will be possible without interference caused by the bottom of valve handle 11, yet holes 12 should not be placed too low in which excessive vertical movement would occur. The installation of a padlock thus allows the lockout device to remain vertically secured and prevent unauthorized removal.

Figure 7:
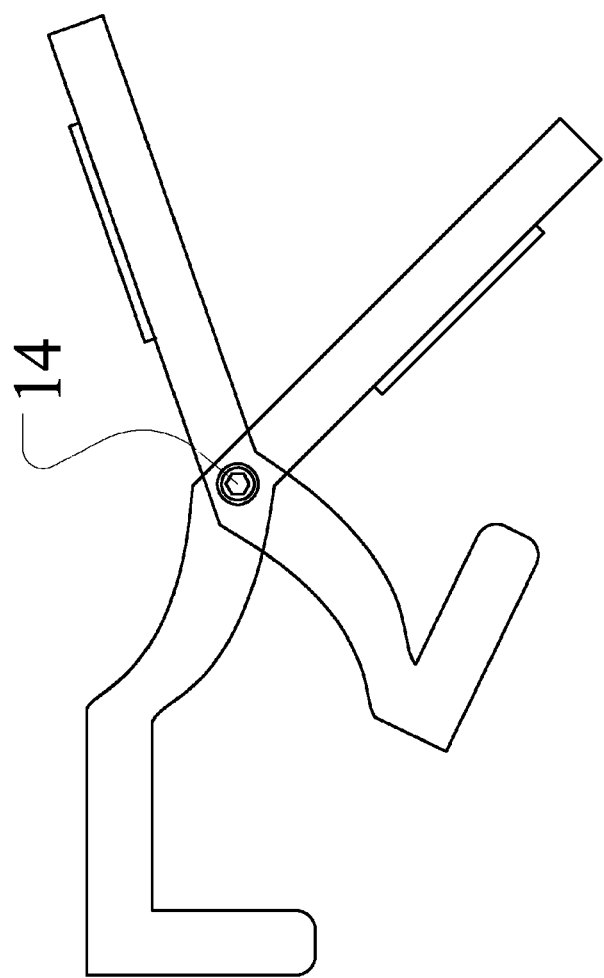

Additionally, an alternate form of the lockout device consisting of a two piece construction wherein a center pivot point 14 provides a scissors type action between a first scissor piece and a second scissor piece is shown in FIG. 7. The scissors type action moveably engages the pump pivot point linkage and the handle of the selector valve. One parallel locking ear is on the first scissor piece and a second parallel locking ear is on the second scissor piece to form the pump engagement portion of the lockout device. One parallel locking plate is on the first scissor piece and a second parallel locking plate is on the second scissor piece to form the locking arm. All existing manufacturing dimensions would be identical of the device 10 described within. The alternate design increases the weight of the lockout device and associated manufacturing costs; however it could potentially ease installation and possibly eliminate the need for the chamfering 6 of the parallel ears 5.

The invention claimed is:

1. A lockout device for a rotary, quarter turn, manually operated, selector valve that is mounted on a common assembly with a manually operated pump, where operating positions of the selector valve are at 0 degree and 90 degree positions and where a desired lockout position is a 45 degree position associated with a closed position of the selector valve, comprising:
   a pump engagement portion with an opening for engaging a pump pivot point linkage on the manually operated pump and substantially preventing rotation of the lockout device around the pump pivot point linkage when the lockout device is engaged; and
   a locking arm in a fixed 45 degree relationship with the pump engagement portion for engaging a handle of the selector valve such that the selector valve is maintained in the closed position when the lockout device is engaged.

2. The lockout device of claim 1, further comprising a connecting arm between the pump engagement portion and the locking arm to maintain the fixed 45 degree relationship.

3. The lockout device of claim 2, wherein the connecting arm defines a radius that prevents interference with a fastener that secures the handle of the selector valve.

4. The lockout device of claim 1, wherein the pump engagement portion comprises parallel locking ears for engaging opposing sides of the pump pivot point linkage to substantially prevent rotation of the lockout device around the pump pivot point linkage.

5. The lockout device of claim 4, wherein the parallel locking ears have an internal chamfer comprising an inner edge of a first of the parallel locking ears and an inner edge of a second of the parallel locking ears that define angled parallel surfaces for receiving the pump pivot point linkage.

6. The lockout device of claim 1, wherein the locking arm comprises parallel locking plates restrictively engaging opposing sides of the handle of the selector valve.

7. The lockout device of claim 6, wherein the parallel locking plates include at least one aligned pair of holes for receiving at least one hasp type lock.

8. The lockout device of claim 1, wherein the pump engagement portion and the locking arm are a single and continuous piece.

9. The lockout device of claim 8, wherein the lockout device is made from sheet steel.

10. The lockout device of claim 1, comprising a first scissor piece connected by a pivot to a second scissor piece for moveably engaging the pump pivot point linkage and the handle of the selector valve, wherein a first parallel locking ear is on the first scissor piece and a second parallel locking ear is on the second scissor piece to form the pump engagement portion and a first parallel locking plate is on the first scissor piece and a second parallel locking plate is on the second scissor piece to form the locking arm.

11. A lockout device, comprising:
    a pump engagement portion with an opening for engaging a pump pivot point linkage on a manually operated pump and substantially preventing rotation of the lockout device around the pump pivot point linkage when the lockout device is engaged; and
    a locking arm in a fixed relationship with the pump engagement portion for engaging a handle of a selector valve on a common assembly with the manually operated pump such that the selector valve is maintained in the closed position when the lockout device is engaged.

12. The lockout device of claim 11, further comprising a connecting arm between the pump engagement portion and the locking arm to maintain a fixed 45 degree relationship.

13. The lockout device of claim 12, wherein the connecting arm defines a radius that prevents interference with a fastener that secures the handle of the selector valve.

14. The lockout device of claim 11, wherein the pump engagement portion comprises parallel locking ears for engaging opposing sides of the pump pivot point linkage to substantially prevent rotation of the lockout device around the pump pivot point linkage.

15. The lockout device of claim 14, wherein the parallel locking ears have an internal chamfer comprising an inner edge of a first of the parallel locking ears and an inner edge of a second of the parallel locking ears that define angled parallel surfaces for receiving the pump pivot point linkage.

16. The lockout device of claim 11, wherein the locking arm comprises parallel locking plates restrictively engaging opposing sides of the handle of the selector valve.

17. The lockout device of claim 16, wherein the parallel locking plates include at least one aligned pair of holes for receiving at least one hasp type lock.

18. The lockout device of claim 11, wherein the pump engagement portion and the locking arm are a single and continuous piece.

19. The lockout device of claim 8, wherein the lockout device is made from sheet steel.

20. The lockout device of claim 11, comprising a first scissor piece connected by a pivot to a second scissor piece for moveably engaging the pump pivot point linkage and the handle of the selector valve, wherein a first parallel locking ear is on the first scissor piece and a second parallel locking ear is on the second scissor piece to form the pump engagement portion and a first parallel locking plate is on the first scissor piece and a second parallel locking plate is on the second scissor piece to form the locking arm.

* * * * *